(12) United States Patent
Kunigita et al.

(10) Patent No.: US 9,485,467 B2
(45) Date of Patent: Nov. 1, 2016

(54) INFORMATION PROCESSING SYSTEM AND INFORMATION PROCESSING DEVICES

(75) Inventors: Hisayuki Kunigita, Kanagawa (JP);
Seung-Hyun Lee, Seoul (KR);
Taek-Joo Lee, Seoul (KR); Ju-Yeong Ji, Seoul (KR)

(73) Assignees: Sony Corporation, Tokyo (JP); Sony Interactive Entertainment Inc., Tokyo (JP)

( * ) Notice: Subject to any disclaimer, the term of this patent is extended or adjusted under 35 U.S.C. 154(b) by 838 days.

(21) Appl. No.: 13/060,369

(22) PCT Filed: Aug. 6, 2009

(86) PCT No.: PCT/JP2009/003781
§ 371 (c)(1),
(2), (4) Date: Apr. 27, 2011

(87) PCT Pub. No.: WO2010/023828
PCT Pub. Date: Mar. 4, 2010

(65) Prior Publication Data
US 2011/0196918 A1 Aug. 11, 2011

(30) Foreign Application Priority Data
Aug. 29, 2008 (JP) ................. 2008-222446

(51) Int. Cl.
*G06F 15/16* (2006.01)
*H04N 7/173* (2011.01)
*H04N 5/76* (2006.01)
*H04N 21/242* (2011.01)
*H04N 21/4788* (2011.01)

(52) U.S. Cl.
CPC ............... *H04N 7/173* (2013.01); *H04N 5/76* (2013.01); *H04N 21/242* (2013.01); *H04N 21/4788* (2013.01)

(58) Field of Classification Search
USPC .......................................... 709/203
See application file for complete search history.

(56) References Cited

U.S. PATENT DOCUMENTS

| | | | |
|---|---|---|---|
| 5,987,525 A | 11/1999 | Roberts |
| 6,005,600 A | 12/1999 | Hill |
| 6,161,132 A | 12/2000 | Roberts |
| 6,563,999 B1 | 5/2003 | Suzuoki |

(Continued)

FOREIGN PATENT DOCUMENTS

| | | |
|---|---|---|
| EP | 2068528 A1 | 6/2009 |
| JP | 2002218277 A | 8/2002 |

(Continued)

OTHER PUBLICATIONS

Office Action issued for corresponding Korean Patent Application No. 10-2011-7006432, dated Sep. 11, 2012.

(Continued)

*Primary Examiner* — Douglas W Owens
*Assistant Examiner* — Monica C King
(74) *Attorney, Agent, or Firm* — Matthew B. Dernier, Esq.

(57) ABSTRACT

The time in the host device and the time in the client device are synchronized. The host device and the client device download content data from a content distribution server using progressive downloading. The host device controls playback processes in the host device and the client device so as to be synchronized, in accordance with a download status in the host device and the client device.

10 Claims, 8 Drawing Sheets

(56) References Cited

U.S. PATENT DOCUMENTS

| | | | |
|---|---|---|---|
| 7,272,062 B2* | 9/2007 | Taddeo | 365/207 |
| 7,426,593 B2 | 9/2008 | Tomita | |
| 7,797,633 B2* | 9/2010 | Flick et al. | 715/726 |
| 7,853,704 B2* | 12/2010 | Sakoh et al. | 709/229 |
| 8,020,159 B2* | 9/2011 | Hanyu | 717/178 |
| 8,099,519 B2* | 1/2012 | Ueda et al. | 709/246 |
| 8,190,683 B2* | 5/2012 | Sloo et al. | 709/205 |
| 8,219,493 B2* | 7/2012 | Gupte | 705/52 |
| 8,230,456 B2* | 7/2012 | Jacoby et al. | 725/9 |
| 8,272,062 B2* | 9/2012 | Miki et al. | 726/26 |
| 2002/0099774 A1 | 7/2002 | Yamato | |
| 2006/0190618 A1 | 8/2006 | Tomita | |
| 2008/0133767 A1* | 6/2008 | Birrer et al. | 709/231 |
| 2010/0283586 A1* | 11/2010 | Ikeda et al. | 340/10.42 |

FOREIGN PATENT DOCUMENTS

| | | |
|---|---|---|
| JP | 2005244605 A | 9/2005 |
| JP | 2006235897 A | 9/2006 |
| JP | 2007104193 A | 4/2007 |
| JP | 2007257820 A | 10/2007 |
| WO | 2007133847 A2 | 11/2007 |
| WO | 2009071321 A1 | 6/2009 |

OTHER PUBLICATIONS

Office Action issued for corresponding Korean Patent Application No. 10-2011-7006432, dated Mar. 26, 2013.
International Search Report for JP Application PCT/JP2009/003781, dated Sep. 8, 2009.
International Preliminary Report on Patentability for JP Application PCT/JP2009/003781, dated Apr. 12, 2011.
Office Action issued for corresponding Japanese Patent Application No. 2010-526515, dated Dec. 11, 2012.
European Search Report for corresponding European Patent Application No. 09809485, dated Dec. 22, 2014.
Fernando Boronat Segu Prg A—et al: "An RTP/RTCP based approach for multimedia group and inter-stream synchronization", Multimedia Tools and Applications, Kluwer Academic Publishers, BO, vol. 40, No. 2, 25 , pp. 285-319, (Jun. 2008 ).
Nunome T et al: Inter-Destination Synchronization Schemes for Continuous Media Multicasting: An Application-Level QOS Comparison in Hierarchical Networks 11, IEICE Transactions on Communications, Communications Society, Tokyo, JP, vol. E87-B, No. 10, pp. 3057-3067, (Oct. 2004).
Ian F Akyildiz et al: Multimedia Group Synchronization Protocols for Integrated Services Networks, IEEE Journal on Selected Areas in Communications, IEEE Service Center, Piscataway, US, vol. 14, No. 1, pp. 164-173, (Jan. 1996).
Office Action issued for corresponding Chinese Patent Application No. 200980132960.0, dated Nov. 5, 2012.

* cited by examiner

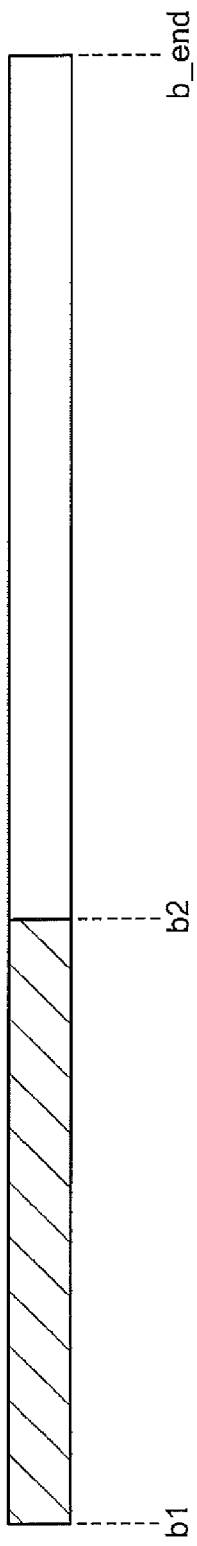
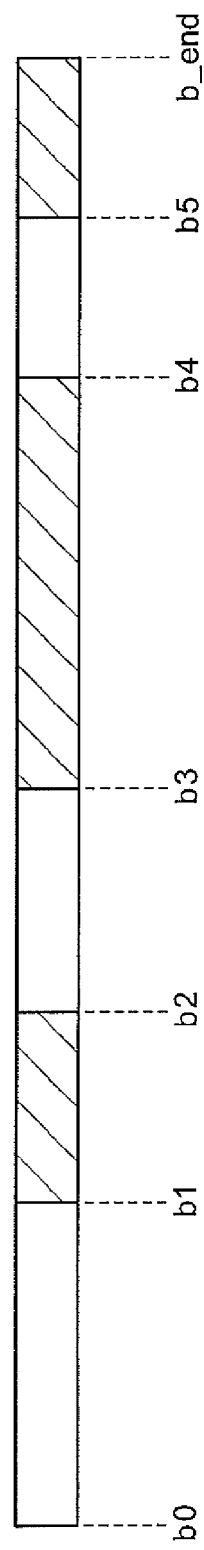
FIG.7A
FIG.7B

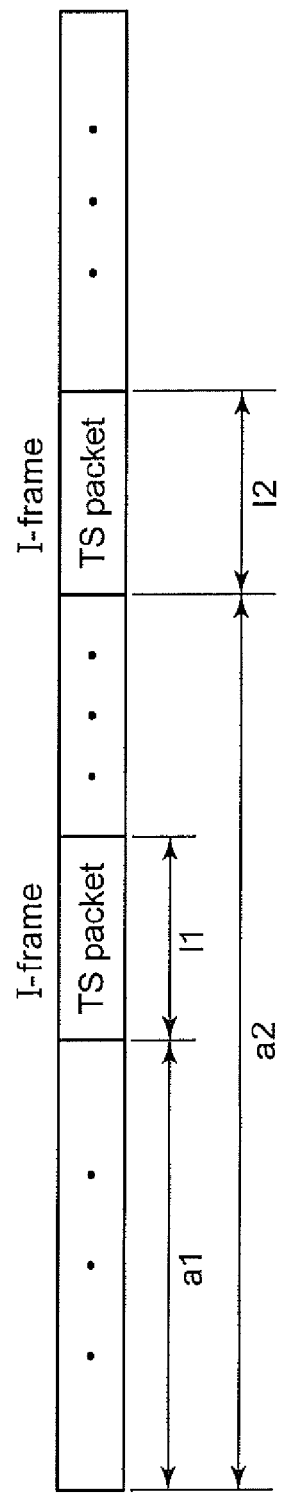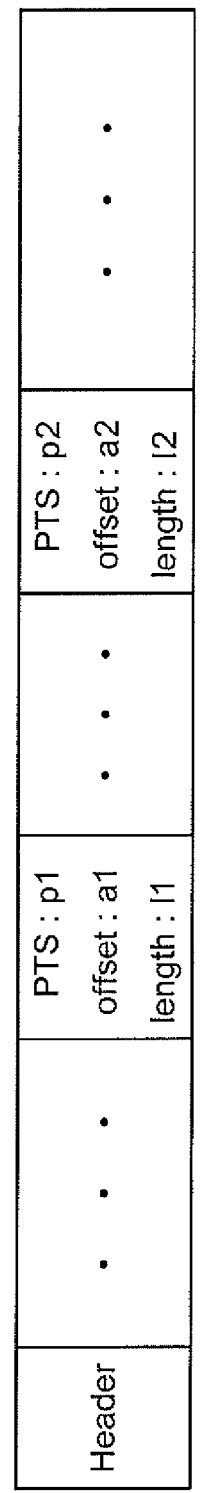
FIG.8A
FIG.8B

INFORMATION PROCESSING SYSTEM AND INFORMATION PROCESSING DEVICES

TECHNICAL FIELD

The present invention relates to a technology used in information processing devices adapted to process content data and, more particularly, to a technology of allowing a plurality of information processing devices connected to a network to play back content data in synchronization.

BACKGROUND ART

Services that allow content data such as movies (motion pictures) or music to be distributed via the Internet are widely available. Recently, in particular, progressive download services are in actual use associated with improvement in high-speed network access so that image data can be played back concurrently while downloading the data in large volume storage devices of information processing devices.

Communication technology using the PeertoPeer (P2P) model as an architecture for communicating between a large number of users is receiving attention. Characteristically, the P2P model allows direct access to a terminal of an ordinary user from terminals of other users. The advantage is that, as compared with the client server model in which a server is loaded with heavy traffic, communication continues to be available even if the number of terminals grows enormously so long as sufficient circuit bandwidth is allocatable. Recently, services that allow content data to be distributed in the P2P model have been in actual use.

Details of certain know systems and devices may be found in U.S. Pat. No. 6,563,999.

In real world situations, friends may go to a film theater together or get together in the home one of them to watch a movie. By watching a movie with friends, people can share the impression they felt and can enjoy the movie more than otherwise. In arranging such an event, however, people often experience difficulty in schedule adjustment. It is particularly difficult for friends at remote locations to join. It will be desirable in this respect to build a virtual film theater and provide an environment in which a plurality of persons can share the impression they felt.

In this background, the present invention provides a technology of playing back content data in synchronization between a plurality of information processing devices.

SUMMARY OF THE INVENTION

The information processing device according to one embodiment is an information processing system in which a content distribution server, a host device, and at least one client device are connected via a network. The client device comprises: a first storage unit configured to store content data downloaded from the content distribution server; a first processing unit configured to play back the content data stored in the first storage unit; a first detection unit configured to detect a status of downloading the content data; and a first notification unit configured to communicate the detected download status to the host device. The host device comprises: an acquisition unit configured to acquire the download status communicated from the client device; and a control unit configured to control a playback process in the client device in accordance with the communicated download status. The content data may be motion picture data.

Another embodiment of the present invention relates to an information processing device. The information processing device comprises: a storage unit configured to store content data downloaded from a content distribution server; a processing unit configured to play back the content data stored in the storage unit; a detection unit configured to detect a status of downloading the content data; and a notification unit configured to communicate the detected download status to a host device, wherein the processing unit suspends the playback process when a frame identified by last frame information communicated from the host device is played back.

Optional combinations of the aforementioned constituting elements, and implementations of the invention in the form of methods, apparatuses, systems, recording mediums and computer programs may also be practiced as additional modes of the present invention.

According to the present invention, a technology is provided capable of playing back content data in synchronization between a plurality of information processing devices.

BRIEF DESCRIPTION OF THE DRAWINGS

FIG. 7A shows the status of downloading content data using progressive downloading, and FIG. 7B shows the status of downloading content data in the P2P model; and FIG. 8A illustrates a motion picture file containing content data by way of an explanatory example, and FIG. 8B illustrates an index file by way of an explanatory example.

DETAILED DESCRIPTION OF THE PREFERRED EMBODIMENTS

Figure 1:
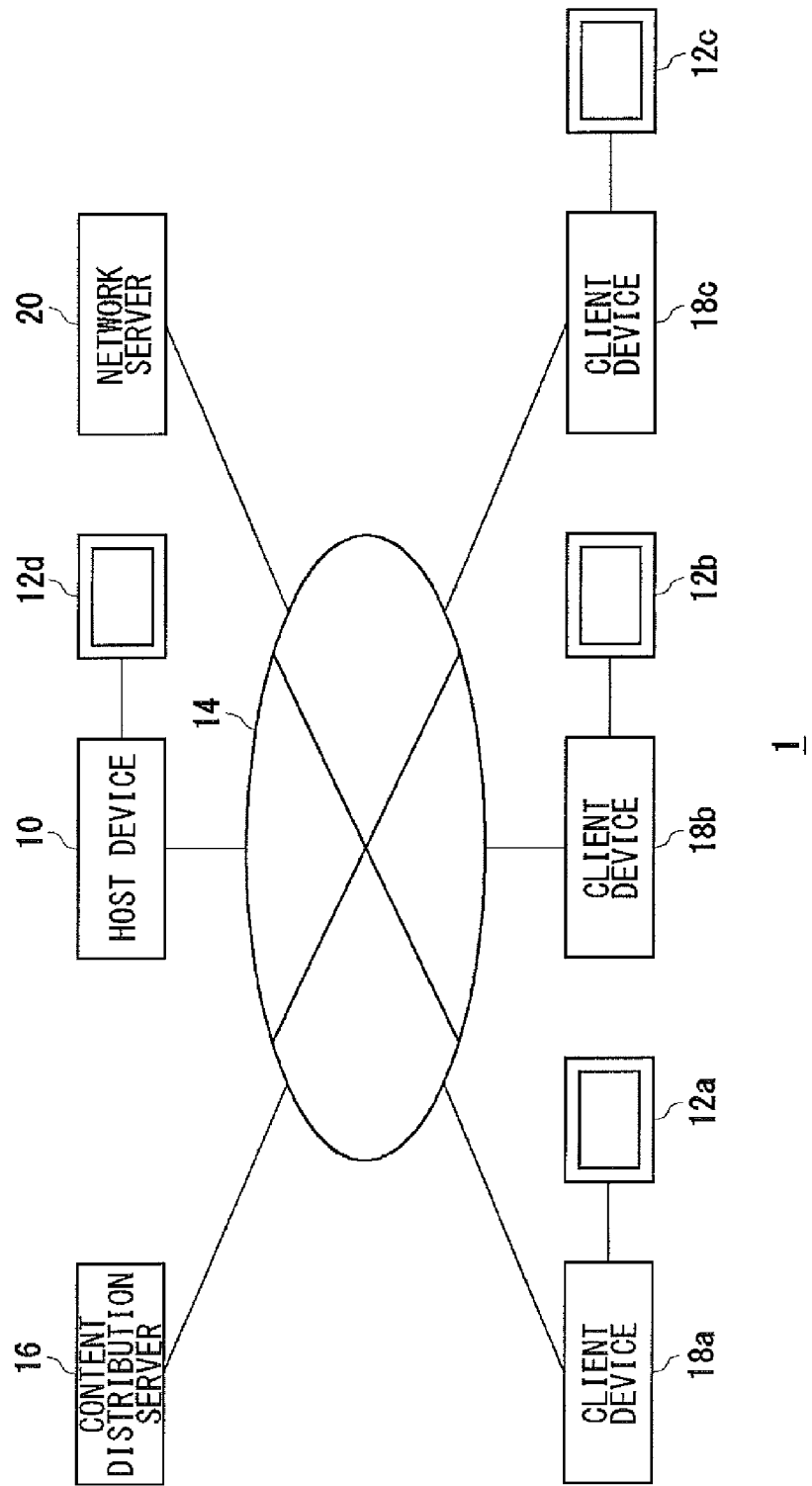
FIG. 1 shows an information processing system according to an embodiment of the present invention.

FIG. 1 shows an information processing system according to an embodiment of the present invention. The information processing system 1 comprises a host device 10, a content distribution server 16, client devices 18a, 18b, and 18c (hereinafter, generically referred to as "client devices 18" when needed), and a network server 20. The host device 10, the content distribution server 16, the client devices 18, and the network server 20 are connected via a network 14 so as to be capable of communicating with each other. The network 14 may be the Internet, which uses the TCP/IP protocol.

The client devices 18a, 18b, and 18c, and the host device 10 are provided with output devices 12a, 12b, 12c, and 12d (hereinafter, generically referred to as output devices 12 when needed), respectively, for outputting processing results. The output device 12 may be a television set provided with a display for outputting an image and a speaker for outputting sound.

The content distribution server 16 is run by, for example, a video distribution company and provides content data to the host device 10 and the client devices 18. For example, the content data may be AV data compressed in the MPEG2 format. The host device 10 and the client devices 18 acquire the AV data (e.g., movie) from the content distribution server 16 using progressive download method. This allows the host device 10 and the client devices 18 to download the AV data in a storage unit comprising, for example, a hard disk drive, outputting video and sound to the output devices 12 at the same time. The information processing system 1 according to the embodiment provides an environment where people located in different places can feel as if they are enjoying the same movie concurrently.

Due to the growing availability of broadband networks enabling high-speed communication, video or audio streams, or text data can be transmitted and received between information processing devices connected to the Internet. By allowing information processing devices to play back received streams or text data, a chat system in which devices can share a virtual space is built. In one embodiment of the information processing system 1, a virtual film theater is built by allowing the network server 20 to build a chat system, and allowing the host device 10 to play back content data (e.g., movie), establishing synchronization between a plurality of information processing devices including the host device 10 itself.

In the information processing device 1, the host device 10, as well as the client devices 18, operates as an information processing device that plays back content data (e.g., movie) in synchronization. In addition to the capabilities of playing back content data, the host device 10 has the role of controlling the process of playback in the client devices 18. For example, when a plurality of users wish to view the same movie in the information processing system 1, the information processing device of one of the users may operate as the host device 10 and the information processing devices of the other users may operate as the client devices 18. The function of the host device 10 may be embodied in a management server (not shown) connected to the network server 14. In this case, the management server need not be provided with the capabilities of playing back content data.

Figure 2A:
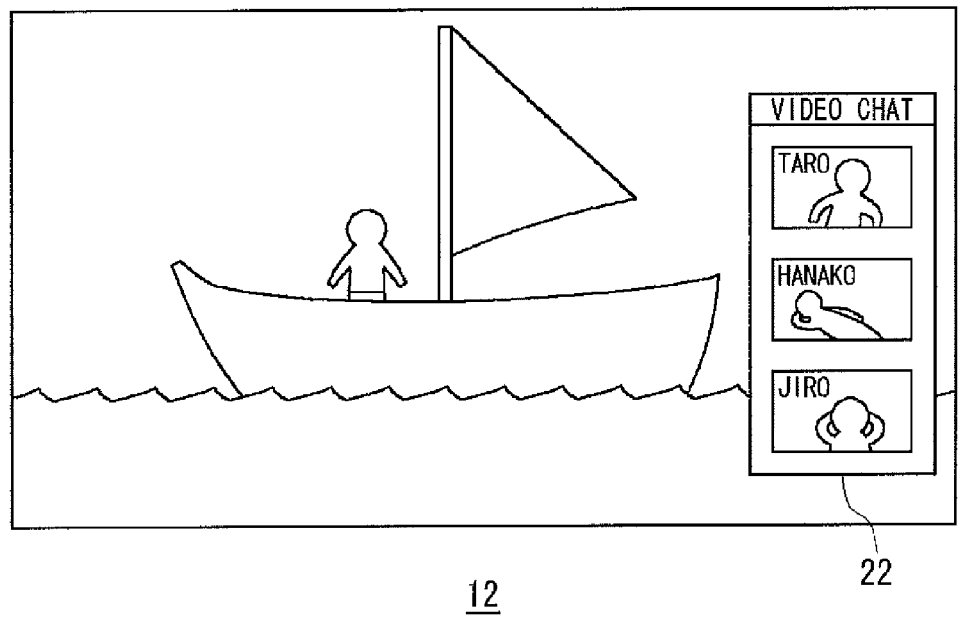
FIG. 2A shows an example of a screen showing a movie being played back and displayed on an output device.

FIG. 2A shows an example of a screen showing a movie being played back and displayed on the output device 12. The screen of the output device 12 shows a progressively downloaded movie being played back. A video chat window 22 that displays users viewing the same movie is created in a part of the screen. Each user is equipped with a camera and a microphone. Streams of image data captured by the camera and sound data picked up by the microphone are distributed to the information processing devices of the other users via the network 14. As shown, images of users other than the user viewing the output device 12 are displayed in the video chat window 22 in realtime and sound is output in realtime. Thus, by building a video chat system, the information processing system 1 can implement a virtual film theater, allowing a plurality of users to enjoy a movie at the same time. The information processing system 1 may be configured to build a voice chat system by distributing only streams of sound data from the information processing devices.

Figure 2B:
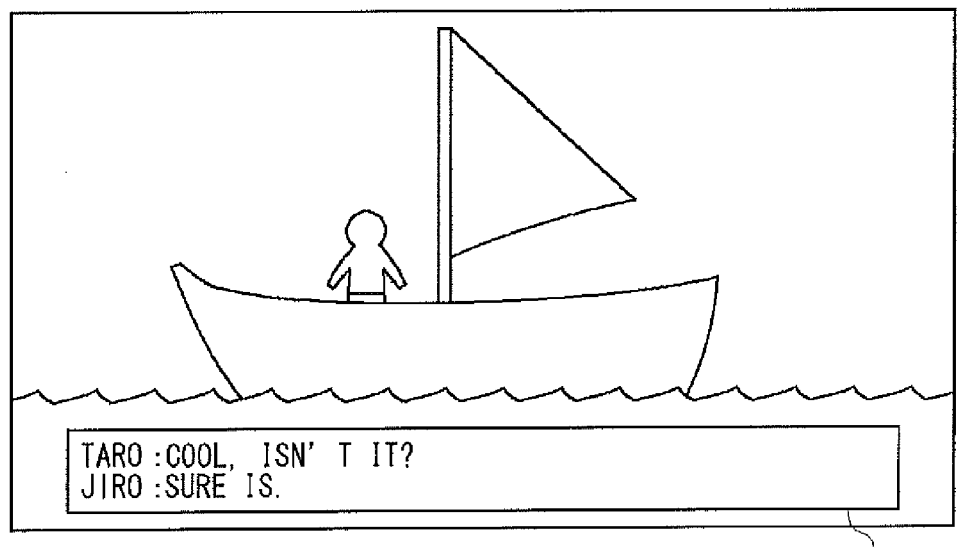
FIG. 2B shows another example of a screen showing a movie being played back and displayed on the output device.

FIG. 2B shows another example of a screen showing a movie being played back and displayed on the output device 12. The screen of the output device 12 shows a progressively downloaded movie being played back. A text chat window 24 that displays text data entered by the other users is created in a part of the screen. Each user is equipped with a text input device such as a keyboard. Text data input via the text input device is transmitted to the information processing devices of the other users via the network 14. Thus, the information processing system 1 may be configured to build a virtual film theater by building a text chat system.

In the information processing system 1 of the embodiment, one of the information processing devices that serves as the host device 10 creates a virtual room (chat room) for chatting in the network server 20. The host user of the host device 10 designates a user to be invited to the chat room and transmits an invitation message from the host device 10 to the information processing device of the designated user. When the guest user accepts the invitation to the chat room via the information processing device and enters the chat room, a chat system is built between users entering the chat room.

Figure 3:
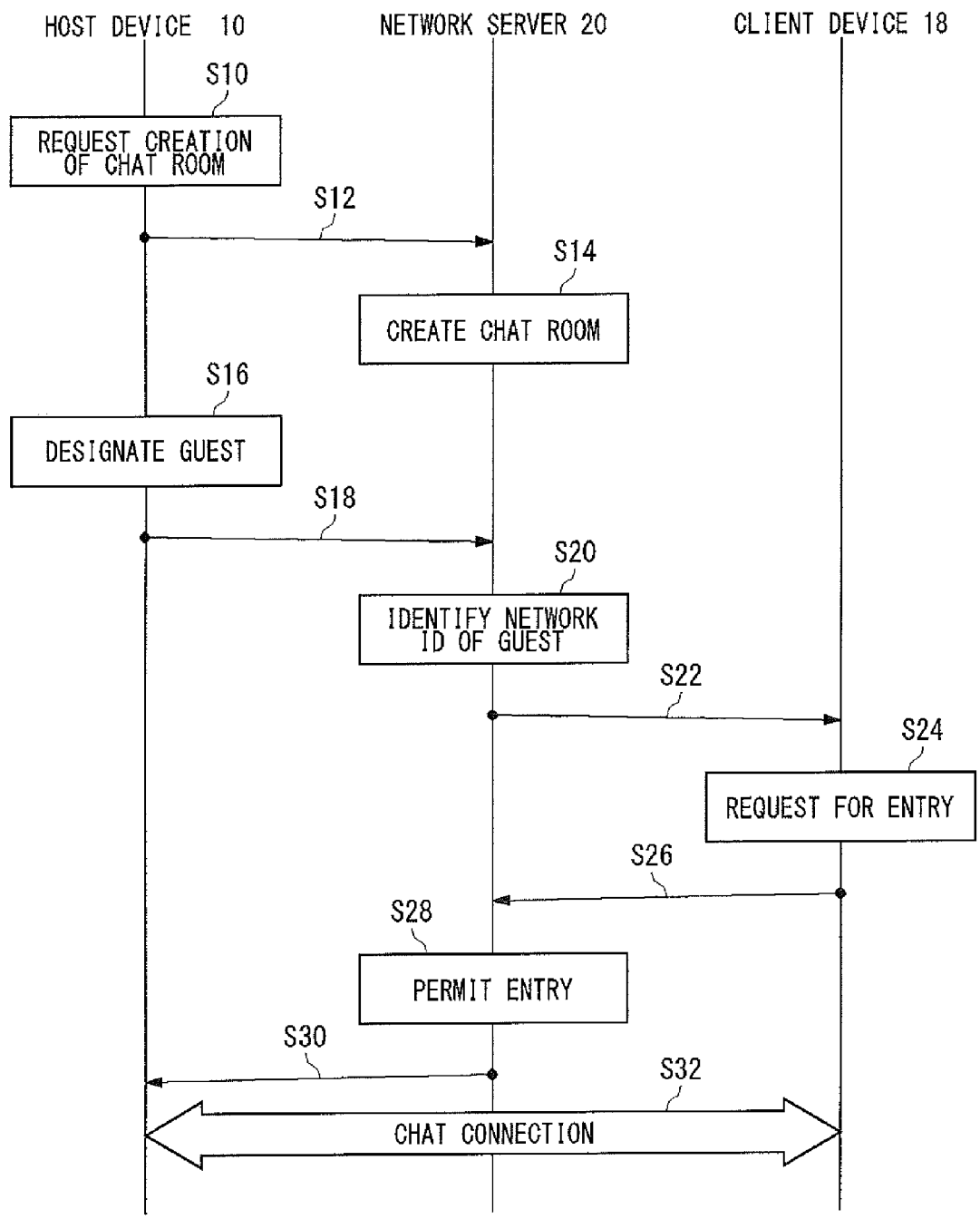
FIG. 3 is a sequence chart showing the process of establishing a chat connection.

FIG. 3 is a sequence chart showing the process of establishing a chat connection. The network server 20 manages network IDs, address information, and user IDs of the information processing devices participating in the information processing system 1, associating the IDs and the information with each other. First, the host device 10 generates a request to create a chat room (S10). The request to create a chat room is transmitted to the network server 20 (S12) so that the network server 20 creates a chat room (S14). The host device 10 maintains the user IDs of a plurality of other users and selects a guest user to be invited to the chat room (S16) and transmits the user ID of the guest user and the invitation message to the network server 20 (S18).

The network server 20 identifies the network ID of the information processing device (client device 18) of the guest user by referring to the user ID of the guest user (S20). The server 20 forwards the invitation message to the address associated with the network ID (S22). The client device 18 generates a request for entry indicating acceptance to the invitation message (S24) and transmits the request to the network server 20 (S26). Upon receipt of the request, the network server 20 permits the entrance of the guest user to the chat room (S28) and transmits the address information of the client device 18 to the host device 10 (S30). The host device 10 accesses the client device 18 by referring to the transmitted address information and establishes chat connection accordingly (S32). This allows the host user of the host device 10 and the guest user of the client device 18 to chat with each other.

By allowing the host device 10 to perform a similar process in relation to other information processing devices, a plurality of guest users can enter the chat room. The address information of all users that entered the chat room is communicated to the respective client devices 18. The host device 10 and the client devices 18 transmit stream data or text data to the other entrant users. This allows the users that entered the chat room to chat with each other.

The host device 10 maintains the address information of all users that entered the chat room. In the information processing system 1 of this embodiment, the host device 10 transmits to the content distribution server 16 information identifying the content data requested for download and the address information of all users that entered the chat room. The content distribution server 16 transmits the content data to all communicated addresses. This establishes an environment in which the host device 10 and the client devices 18 can play back the content data in synchronization.

The host device 10 and the client devices 18 may transmit information identifying the content data requested for download to the content distribution server 16 along with a request for connection. The content distribution server 16 distributes the content data to the host device 10 and the client devices 18 that requested connection. An environment in which the host device 10 and the client devices 18 play back content data may be established in this way.

In this case, the host device 10 may communicate to the content distribution server 16 the address information on all users that entered the chat room so that the host device 10 and the client devices 18 transmit to the content distribution server 16 information identifying the content data requested for download, along with a request for connection. The content distribution server 16 determines whether the server 16 may respond to the request for connection transmitted from the host device 10 or the client device 18 by referring to the address information communicated in advance. More specifically, if the address information of the information processing device that transmitted the request for connection is found in the plurality of address information items communicated in advance, the content distribution server 16 may determine that the server may respond to the request for connection and transmit the content data to the information processing device.

Figure 4:
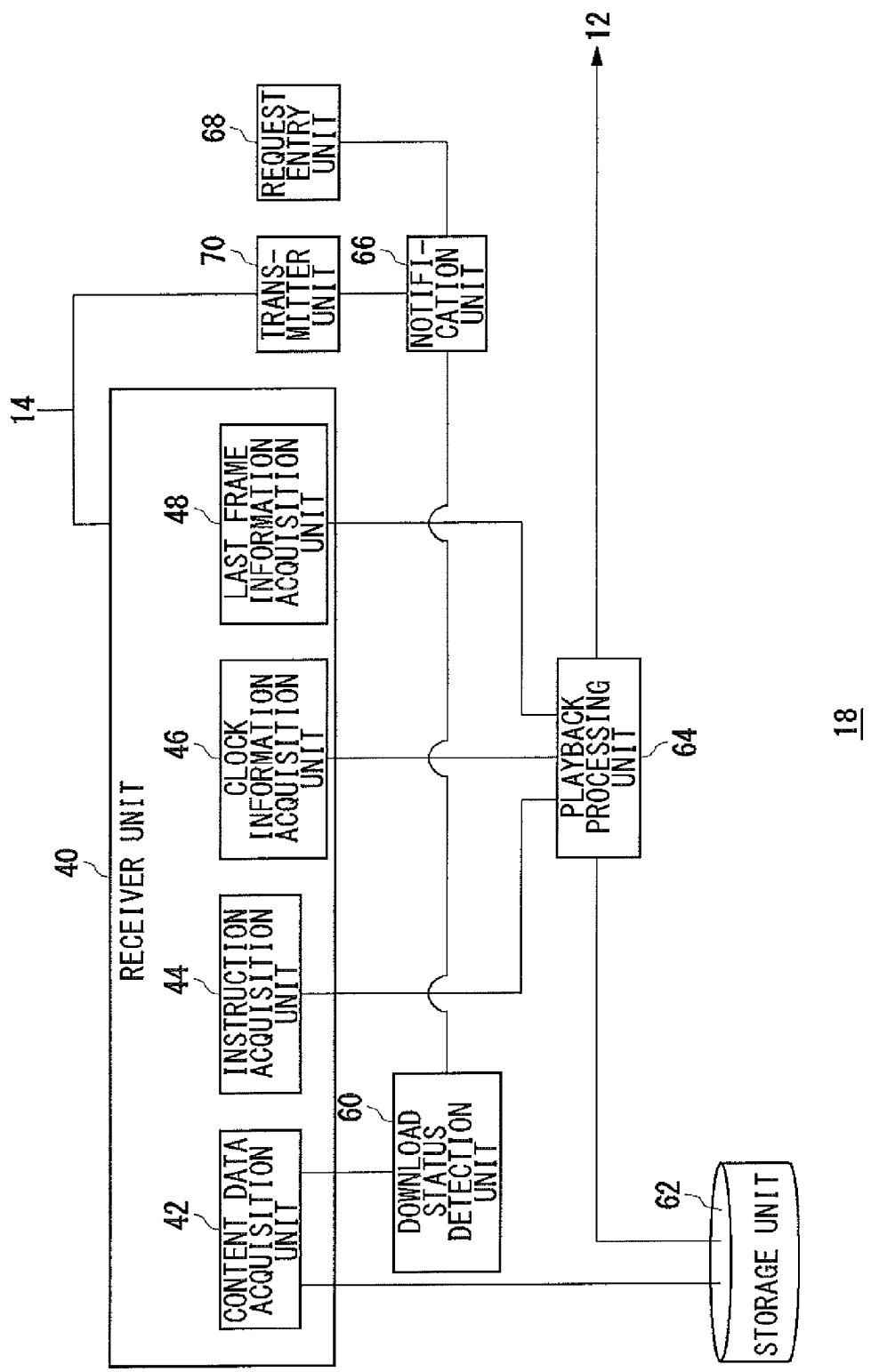
FIG. 4 shows a configuration of a client device equipped with the capabilities of playing back content data.

FIG. 4 shows a configuration of the client device 18 equipped with the capabilities of playing back content data. The client device 18 comprises a receiver unit 40, a download status detection unit 60, a storage unit 62, a playback processing unit 64, a notification unit 66, a request entry unit 68, and a transmitter unit 70. The receiver unit 40 is provided with a content data acquisition unit 42, an instruction acquisition unit 44, a clock information acquisition unit 46, and a last frame information acquisition unit 48.

Figure 5:
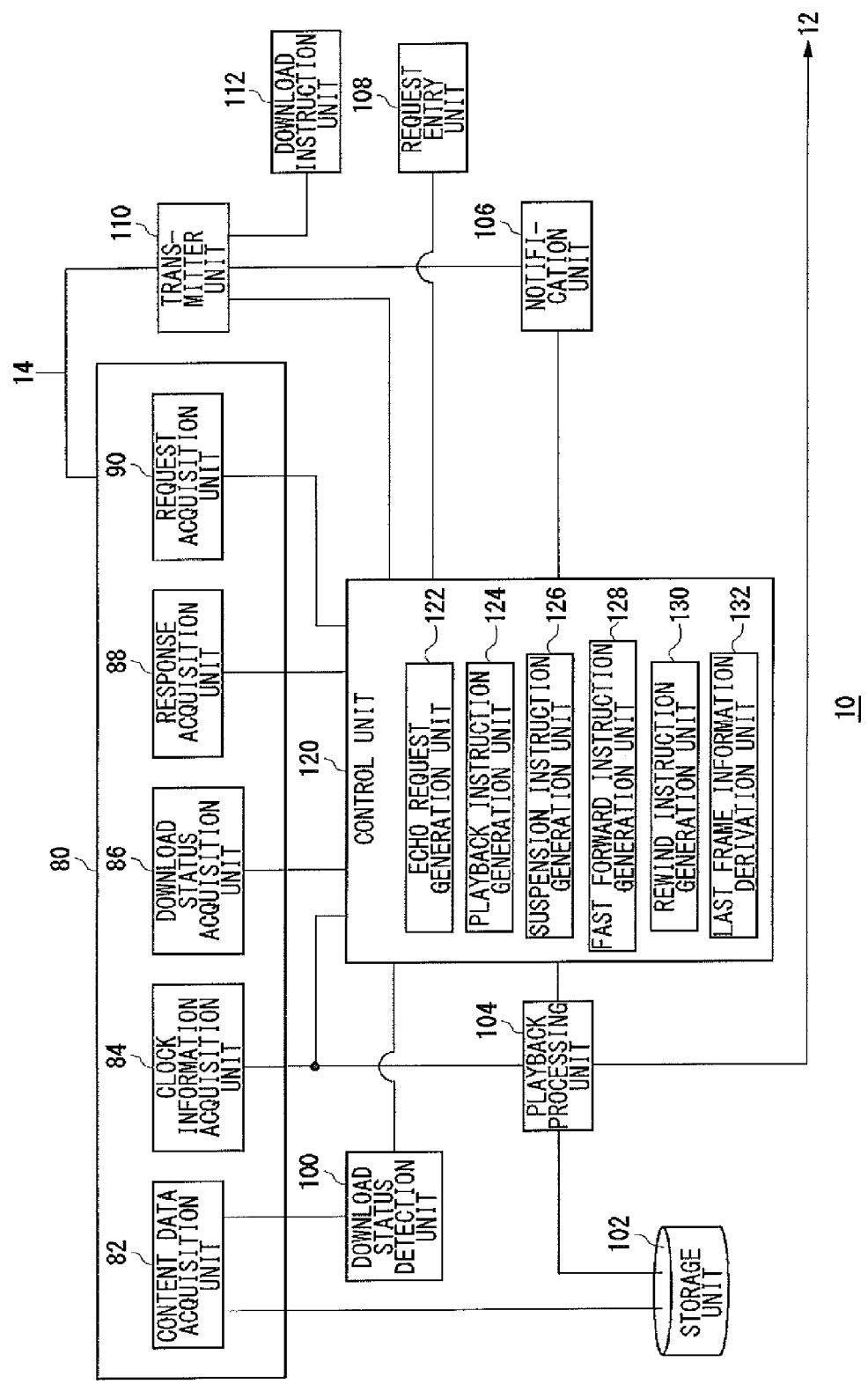
FIG. 5 shows a configuration of a host device equipped with the capabilities of playing back content data and the capabilities of controlling the client devices.

FIG. 5 shows a configuration of the host device 10 equipped with the capabilities of playing back content data and the capabilities of controlling the client devices. The host device 10 comprises a receiver unit 80, a download status detection unit 100, a storage unit 102, a playback processing unit 104, a notification unit 106, a request entry unit 108, and a transmitter unit 110, a download instruction unit 112, and a control unit 120. The receiver 80 is provided with a content data acquisition unit 82, a clock information acquisition unit 84, a download status acquisition unit 86, a response acquisition unit 88, and a request acquisition unit 90. The control unit 120 is provided with an echo request generation unit 122, a playback instruction generation unit 124, a suspension instruction generation unit 126, a fast forward instruction generation unit 128, a rewind instruction generation unit 130, and a last frame information derivation unit 132.

The elements depicted in FIGS. 4 and 5 as functional blocks for performing various processes are implemented in hardware such as a central processing unit (CPU), memory, or other LSI's, and in software such as a program etc., loaded into a memory. Therefore, it will be obvious to those skilled in the art that the functional blocks may be implemented in a variety of manners in hardware only, software only, or a combination of thereof.

As described above, the host device 10 and the client devices 18 may be information processing devices having the same processing capabilities. Therefore, in case an information processing device operates as the host device 10, the functional blocks shown in FIG. 5 are built in the information processing device. If the information processing device operates as the client device 18, the functional blocks shown in FIG. 4 are built. The host device 10 according to this embodiment is provided with the capabilities of playing back content data like the client devices 18. More specifically, the content data acquisition unit 82, the clock information acquisition unit 84, the download status detection unit 100, the storage unit 102, and the playback processing unit 104 shown in FIG. 5 implement the capabilities for playback. These components respectively perform the same operations as the content data acquisition unit 42, the clock information acquisition unit 46, the download status detection unit 60, the storage unit 62, and the playback processing unit 64 shown in FIG. 4. The storage unit 62 and the storage unit 102 may be implemented by a large capacity storage device such as a hard disk drive.

A description will now be given of the operation of the client devices 18 and the host device 10 with reference to FIGS. 4 and 5. The client device 18 and the host device 10 receive time information according to the network time protocol (NTP) using the clock information acquisition unit 46 and the clock information acquisition unit 84, respectively, and are synchronized in time with reference to the universal time coordinated (UTC). UTC-based time synchronization supported by NTP is by way of example only, and the clock information acquisition unit 46 and the clock information acquisition unit 84 may establish time synchronization by acquiring other clock information that can be shared over the network 14. Alternatively, time synchronization may be established in the devices with reference to the local clock information in one of the client devices 18 and the host device 10.

When a host user selects a content to be viewed, the download instruction unit 112 generates a download instruction that includes information identifying the selected content and the address information indicating the host device 10 and the client devices 18 that the content should be distributed to. The transmitter unit 110 transmits the download instruction to the content distribution server 16. As described above, the download instruction may be transmitted to the content distribution server 16 from each of the information processing device along with a request for connection. In this case, the client device 18 is provided with the download instruction unit 112 so that the device 18 generates a download instruction including the information identifying the content and the transmitter unit 70 transmits the download instruction to the content distribution server 16.

Upon receipt of the download request, the content distribution server 16 distributes the content data to the host device 10 and the client devices 18 by referring to the content identification information and the address information included in the download instruction. This allows the host device 10 and the client device 18 to start downloading the content data.

The content data acquisition unit 42 in the client device 18 acquires the downloaded content and stores the data in the storage unit 62. In this process, the download status detection unit 60 detects the status of downloading the content data. For example, when image content data is compressed in the MPEG2 format, the download status detection unit 60 detects the data volume downloaded, i.e., the downloaded size, as the download status. The notification unit 66 communicates the detected download status to the host device 10 via the transmitter unit 70 at a predetermined cycle. The cycle of notification by the notification unit 66 may be the same as the cycle of detection by the download status detection unit 60. For example, the cycle may be several seconds.

The content data acquisition unit 82 in the host device 10 also acquires the downloaded content and stores the data in the storage unit 102. The download status detection unit 100 detects the status of downloading the content data at a predetermined cycle. Like the download status detection unit 60, the download status detection unit 100 detects the data volume downloaded as the download status when the image content data is compressed in the MPEG2 format. It is preferable that the download status detection unit 100 detects the download status in synchronization with the download status detection unit 60. In this way, the download status reflecting the communication environment of the information processing devices is acquired in the information processing system 1.

The download status acquisition unit 86 in the host device 10 acquires the download status communicated from the client devices 18. The last frame information derivation unit 132 monitors the download status communicated from the client devices 18 and the download status detected by the download status detection unit 100 so as to derive the last frame that can be played back in synchronization.

In the information processing system 1, communication environments in the network 14 differ in the host device 10 and in the plurality of client devices 18. Accordingly, the devices differ in the downloading speed. In order for the host device 10 and the plurality of client devices 18 to play back content data in synchronization, the playback processes in the information processing devices have to be adapted to the playback process in the information processing device with the worst download status.

In this respect, the last frame information derivation unit 132 refers to the communicated download status so as to derive the frame number of the last frame that can be played back in the client devices 18. The unit 132 also refers to the download status of the host device so as to derive the frame number of the last frame that can be played back in the host device. For example, if F1 is derived as being the frame number of the last frame that can be played back in the host device 10, F2 is derived as being the frame number of the last frame that can be played in the client device 18a, F3 is derived as being the frame number of the last frame that can be played back in the client device 18b, and F4 is derived as being the frame number of the last frame that can be played back in the client device 18c, the last frame information derivation unit 132 derives the frame number of the last frame that can be played back in synchronization as follows. It will be assumed that frame numbers are assigned in the content data in the order of frames played back.

(last frame that can be played back in synchronization)=Min(F1, F2, F3, F4)

For example, when the content data is compressed in the MPEG2 format, PTS may be used as information to identify the frame. In this way, the last frame information derivation unit 132 identifies the last frame that can be played back in synchronization in the information processing system 1 by deriving the minimum of F1-F4.

The control unit 120 uses, for example, ping in the TCP/IP network to determine a round trip time between the host and the client device 18 so as to have the knowledge of the circuit condition between the host device 10 and the client device 18. More specifically, the echo request generation unit 112 generates an echo request to the client device 18 connected to the host. The transmitter unit 110 transmits the echo request to the client device 18, and the response acquisition unit 88 receives an echo response from the client device 18. The control unit 120 refers to the time of transmission of the echo request and the time of reception of the echo response so as to derive a propagation delay time between the host and the client device 18. The control unit 120 determines the propagation delay time between the host and the client device 18 experiencing the worst circuit condition as the maximum propagation delay time, by using ping.

The control unit 120 controls the host device 10 and the client devices 18 to synchronize playback, based on the download status in the host device 10 and the download status in the client devices 18. More specifically, the playback instruction generation unit 124 refers to the last frame number derived by the last frame number derivation unit 132 so as to determine whether the host device 10 and the client devices 18 have downloaded the content in the size sufficient for playback in the host device 10 and the client devices 18.

For example, given that playable frame count (PFC)=last frame number, and the number of frames considered to represent a stock sufficient for simultaneous playback in progressive downloading is denoted by PBD (playback back determinant), the playback instruction generation unit 124 determines that the playback process may start in the host device 10 and the client devices 18 when PBD<PFC holds. For example, PBD may be set as the number of frames capable of securing a playback time of one minute.

The playback instruction generation unit 124 generates a playback instruction that contains playback start time and playback start frame information. In the information processing system 1, the time in the host device 10 and the time in the client devices 18 are synchronized with reference to a clock that can be shared (e.g., UTC). The playback start time is represented using the shared clock. In this process, the playback instruction generation unit 124 sets the playback start time by allowing for the maximum propagation delay time occurring between the host device 10 and the client devices 18 and the decoding time required in the client devices 18. The playback start frame information may be the number assigned to the frame at which the playback starts. Normally, playback starts at frame number 0. The notification unit 106 communicates the generated playback instruction to the client devices 18 via the transmitter unit 110.

The instruction acquisition unit 44 in the client device 18 acquires the playback instruction. The playback processing unit 64 refers to the time information supplied by the clock information acquisition unit 46, reading the content data from the storage unit 62 and performing a playback process in accordance with the playback start time and the playback start frame information contained in the playback instruction. Similarly, the playback processing unit 104 in the host device 10 refers to the time information supplied from the clock information acquisition unit 84, reading the content data from the storage unit 102 and performing a playback process in accordance with the playback start time and the playback start frame information contained in the playback instruction generated by the playback instruction generation unit 124.

Even after the playback process is started in the host device 10 and the client devices 18, the content data acquisition unit 82 and the content data acquisition unit 42 continue to download and acquire the content data from the content distribution server 16 and store the data in the storage unit 102 and the storage unit 62, respectively. The download status detection unit 100 in the host device 10 periodically detects the status of downloading the content data and supplies the status to the last frame information derivation unit 132. Similarly, the download status detection unit 60 in the client devices 18 periodically detects the status of downloading the content data so that the notification unit 66 communicates the status to the host device 10. The communicated download status is acquired by the download status acquisition unit 86 and supplied to the last frame information derivation unit 132.

The last frame information derivation unit 132 derives the last frame that can be played back in synchronization by referring to the download status (e.g., downloaded size) of the host device 10 and the client devices 18. The notification unit 106 periodically communicates the information identifying the last frame thus derived (last frame information) to the client devices 18 via the transmitter unit 110. The last frame information acquisition unit 48 in the client devices 18 acquires the communicated last frame information and supplies the information to the playback processing unit 64. The playback processing unit 64 is provided with a memory area for storing the last frame information and stores the supplied last frame information in the memory area. Each time the last frame information is supplied, the playback processing unit 64 updates the memory, overwriting the stored last frame information. Similarly, the playback processing unit 104 in the host device 10 is provided with a memory area for storing the last frame information and stores the last frame information derived by the last frame information derivation unit 132 in the memory area. Each time the last frame information is supplied, the playback processing unit 104 updates the memory, overwriting the stored last frame information.

When the frame identified by the last frame information is played back, the playback processing unit 64 and the playback processing unit 104 suspends the playback process. In this way, the playback processes in all information processing devices are suspended. This avoids a situation where only one of the information processing devices fails to download the content data due to severe communication environment and cannot play back the data while the other information processing devices can continue the playback, thereby ensuring that the uniform playback status prevails in all information processing devices.

When the playback processing unit 104 in the host device 10 has played back the last frame, the suspension instruction generation unit 126 generates an instruction for suspending the playback process temporarily. As already described, the playback processing unit 64 in the client devices 18 suspends the playback process after playing back the last frame. The control unit 120 needs to manage the status of the client devices 18 for synchronized control of the playback processes. For this purpose, the suspension instruction generation 126 generates a temporary suspension instruction so that the notification unit 106 communicates the generated temporary suspension instruction to the client devices 18 via the transmitter unit 110. The temporary suspension instruction contains playback suspension frame information. In this case, the playback suspension frame information represents information identifying the last frame.

In a virtual film theater implemented by the information processing system 1, the progress of a film may be controlled as desired so long as there is an agreement among the users. For example, users may feel thirsty or there may be a phone call while the users are viewing the film. It is preferable that the playback process be temporarily suspended in such a situation. By way of another example, when an impressive scene is missed, the system may preferably return to the scene and play back the scene. To address these circumstances, the host device 10 is provided with a request entry unit 108 and the client devices 18 is provided with a request entry unit 68, so that users can enter a request related to the playback process. The request entered by the request entry unit 68 is communicated from the notification unit 66 to the host device 10 via the transmitter unit 70. The request acquisition unit 90 in the host device 10 acquires the request related to the playback from the client device 18 and supplies the request to the control unit 120. The request related to the playback from the client device 18 may be supplied to the control unit 120 after being accepted by the host user in the host device 10. The request related to the playback entered by the host user via the request entry unit 108 is supplied to the control unit 120. The request related to the playback may be a request for playback from a specified frame (target frame), request for temporary suspension, fast forward request, or rewind and play request.

Upon receipt of the request for playback from a target frame, the playback instruction generation unit 124 determines whether the number of frames between the target frame and the last frame is sufficient for playback. For example, given that PFC=(last frame number)-(target frame number), and the number of frames considered to represent a stock sufficient for simultaneous playback in progressive downloading is denoted by PBD, the playback instruction generation unit 124 generates a playback instruction for playing back the data from the target frame when PBD<PFC holds. In this process, the playback instruction generation unit 124 generates a playback instruction containing playback start time and target frame information. The notification unit 106 communicates the generated playback instruction to the client devices 18 via the transmitter unit 110.

Upon receipt of the temporary suspension request, the suspension instruction generation unit 126 generates a suspension instruction containing playback suspension frame information. The notification unit 106 communicates the generated suspension instruction to the client devices 18 via the transmitter unit 110.

Upon receipt of the fast forward playback instruction, the fast forward instruction generation unit 128 determines whether the number of frames between the current frame and the last frame is sufficient to allow fast forward playback. In this case, PFC=(last frame number)-(current frame number) so that the number of frames considered to be sufficient to allow fast forward playback, i.e., trick play determinant (TPD), will be such that TPD=PBD×(fast forward playback speed/playback speed).

When TPD<PFC holds, the fast forward instruction generation unit 128 generates a fast forward playback instruction for playing back the data from the target frame. More specifically, the fast forward instruction generation unit 128 generates a fast forward instruction containing a fast forward playback start time, fast forward playback start frame information, and information specifying a fast forward playback speed. The information specifying a fast forward playback speed may be (fast forward playback speed/playback speed). The frame number at which the fast forward playback is started is determined by allowing for a time required for the fast forward instruction unit 128 to generate the fast forward instruction. The notification unit 106 communicates the generated fast forward instruction to the client devices 18 via the transmitter unit 110.

Upon receipt of a rewind and play request, the rewind instruction generation unit 130 generates a rewind instruction. More specifically, the rewind instruction generation unit 130 generates a rewind instruction containing a rewind and play start time, rewind and play start frame information, and a rewind and play speed. The information specifying a rewind and play speed may be (rewind and play speed/playback speed). The frame number at which the rewind and play is started is determined by allowing for a time required for the rewind instruction generation unit 130 to generate the rewind instruction. The notification unit 106 communicates the generated rewind instruction to the client devices 18 via the transmitter unit 110.

In the information processing system 1, downloading of content data may start in the middle of the data instead of at the beginning of the data. In this case, the rewind instruction generation unit 130 determines whether the number of frames between the first frame and the current frame in the downloaded content data is sufficient to allow rewind and play. In this case, PFC=(current frame number)−(first frame number) so that the number of frames considered to be sufficient to allow rewind and play, i.e., trick play determinant (TPD), will be such that TPD=PBD×(rewind and play speed/playback speed). When TPD<PFC holds, the rewind instruction generation unit 130 generates a rewind and play instruction for playing back the data from the target frame.

As described above, the host device 10 controls a trick play by referring to the last frame number identified from the download status in a plurality of information processing devices. This allows synchronization between playback processes in the plurality of information processing devices so that all users can enjoy a film in the same environment.

Figure 6:
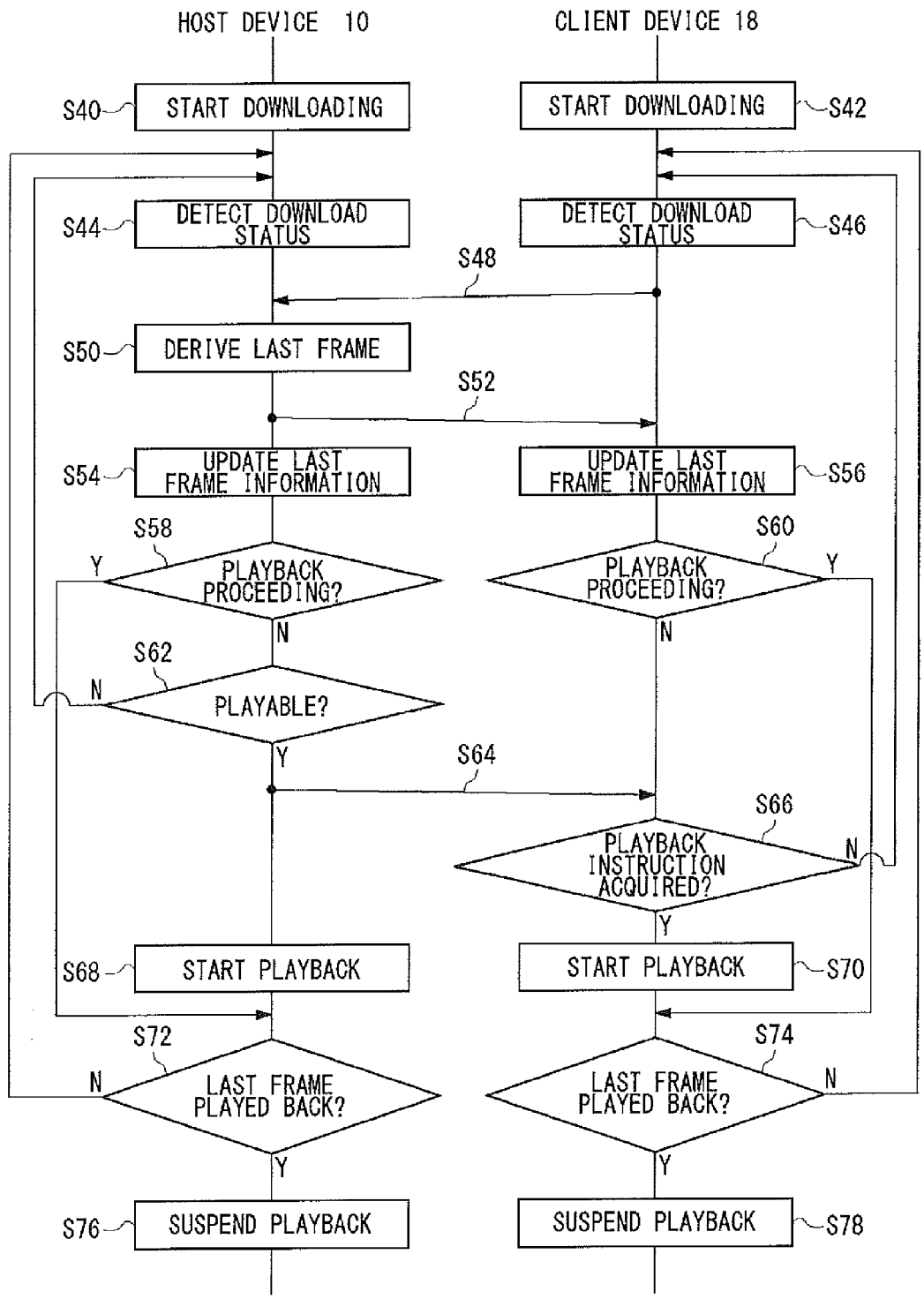
FIG. 6 is a sequence chart showing how the host device controls a play back process synchronized between the host device and the client devices.

FIG. 6 is a sequence chart showing how the host device 10 controls a play back process synchronized between the host device 10 and the client devices 18. The host device 10 and the client devices 18 start downloading the content data (S40, S42). Once the download is started, the download status detection unit 100 and the download status detection unit 60 periodically detect the status of downloading the respective content data (S44, S46). The notification unit 66 in the client device 18 communicates the download status detected by the download status detection unit 60 to the host device 10 (S48). The last frame information derivation unit 132 derives the last frame that can be played back in synchronization by referring to the communicated download status and the download status detected by the download status detection unit 100 (S50). The playback processing unit 104 stores the last frame information in the memory area (S54). The notification unit 106 of the host device 10 communicates the last frame information to the client devices 18 (S52) so that the playback processing unit 64 stores the last frame information in the memory area (S56).

If the process of playing back the content is not started yet (N in S58, N in S60), the playback instruction generation unit 124 determines whether the downloaded content data has an amount sufficient for playback, by referring to the last frame information (S62). If the sufficient data volume is not reached yet, the playback instruction generation unit 124 determines that it is not possible to play back the content data (N in S62). Since a playback instruction is not generated, the instruction acquisition unit 44 in the client devices 18 does not acquire any playback instructions (N in S66). Therefore, the host device 10 performs the steps S44, S50, S52, and S54 again, and the client devices 18 perform the steps S46, S48, and S56 again so that the respective last frame information is updated to the same, latest value. Meanwhile, if the downloaded content data has a sufficient data amount, the playback instruction generation unit 124 determines that the content data can be played back (Y in S62) and generates a playback instruction. The notification unit 106 communicates the playback instruction to the client devices 18 (S64). The instruction acquisition unit 44 acquires the playback instruction (Y in S66). The playback processing unit 104 and the playback processing unit 64 start playing back the content data in accordance with the playback start time and playback start frame information contained in the playback instruction (S68, S70).

If the playback processing unit 104 and the playback processing unit 64 have not played back the last frame after the playback is started (N in S72, N in S74), the host device 10 performs the steps S44, S50, S52, and S54 again, and the client devices 18 perform the steps S46, S48, and S56 again so that the respective last frame information is updated. If the playback processing unit 104 and the playback processing unit 64 have played back the last frame (Y in S72, Y in S74), the respective playback processes are suspended (S76, S78). This avoids a situation where only one of the information processing devices completes the playback while the other information processing devices continue the playback, thereby ensuring that the playback processes in the host device 10 and the client devices 18 are synchronized.

When a request for playing back from a target frame is received while the host device 10 is continuing the steps S44, S50, S52, and S54, the playback instruction unit 124 determines whether PBD<PFC holds. If the relation holds, the unit 124 generates an instruction for playing back the data from the target frame. The playback instruction is communicated to the client devices 18. The playback processing unit 104 and the playback processing unit 64 play back the content data in accordance with the playback start time and playback start frame information contained in the playback instruction.

When the host device 10 receives a temporary suspension request while playing back the content data, the suspension instruction generation unit 126 generates a suspension instruction. The suspension instruction is communicated to the client devices 18. The playback processing unit 104 and the playback processing unit 64 suspend the process of playing back the content data in accordance with the suspension frame information contained in the suspension instruction.

When a fast forward playback request is received while the host device 10 is continuing the steps S44, S50, S52, and S54, the fast forward instruction generation unit 128 determines whether TPD<PFC holds. If the relation holds, the unit 128 generates a fast forward playback instruction for playing back the data from the target frame.

The fast forward playback instruction is communicated to the client devices 18. The playback processing unit 104 and the playback processing unit 64 play back the content data in a fast forward mode in accordance with the fast forward playback start time and fast forward playback start frame information contained in the fast forward playback instruction.

When the host device 10 receives a rewind and play request, the rewind instruction generation unit 130 generates a rewind and play instruction for playing back the data from the target frame. The rewind and play instruction is communicated to the client devices 18. The playback processing unit 104 and the playback processing unit 64 rewind and play back the content data in accordance with the rewind and play start time and rewind and play start frame information contained in the rewind and play instruction.

Described above is an explanation based on an exemplary embodiment. The embodiment is intended to be illustrative only and it will be obvious to those skilled in the art that various modifications to constituting elements and processes could be developed and that such modifications are also within the scope of the present invention.

In the described embodiment, the last frame information derivation unit 132 identifies the last frame that can be played back in synchronization. Alternatively, the unit 132 may identify the last frame indirectly instead of directly identifying the last frame number. For example, the last frame information derivation unit 132 may derive information identifying the group of pictures (GOP) that includes the last frame. Alternatively, the unit 132 may derive information that identifies the playback time elapsed since the start frame at which the playback is started.

The last frame information derivation unit 132 may identify the frame slightly before the last frame. When the last frame information derivation unit 132 derives the last frame from the downloaded data volume, the unit 132 may identify the frame occurring several seconds before the derived last frame and use the identified frame as the last frame. This cancels an error in deriving the last frame and ensures synchronized playback in a plurality of information processing devices. If such a correction is not performed, the playback processing unit 104 and the playback processing unit 64 may suspend the playback process slightly before the last frame.

In the information processing system 1, the client device 18 that downloaded the content data performs the process of playing back the content data. In one variation of the information processing system 1, the client device 18 may transfer the downloaded content data to another client device so that the client device at the destination of transfer performs the process of playing back the content data. The client device at the destination of transfer in the information processing system according to this variation may be a mobile terminal so that the user can enjoy the content data outdoors. The client device 18 is no different from the client device 18 at the destination of transfer as viewed from the host device 10. In this specification, it is assumed that the client device 18 and the client device at the destination of transfer cooperate to form a single client device. In this case, the client device at the destination of transfer should at least be provided with the content data acquisition unit 42, the clock information acquisition unit 46, the playback processing unit 64, and the request entry unit 68. Hereinafter, the client device at the destination of transfer will be referred to as "mobile terminal".

In the information processing system 1 according to the embodiment, the control unit 120 of the host device 10 uses ping to determine a round trip time between the host and the client device 18 so as to have the knowledge of the circuit condition between the host device 10 and the client device 18. This configuration is based on the assumption that the client device 18 performs the process of playing back the content data. When the mobile terminal performs the process of playing back the content data as in the variation, it is necessary to determine a round trip time between the mobile terminal and the host device 10. Therefore, in addition to the components shown in FIG. 4, the client device 18 comprises a control unit provided with the functions of the echo request generation unit and the response acquisition unit shown in FIG. 5.

More specifically, the echo request acquisition unit in the client device 18 generates a request that requests an echo from the mobile terminal. The transmitter unit 70 transmits the echo request to the mobile terminal and the response acquisition unit acquires an echo response from the mobile terminal. The control unit derives the propagation delay time between the requesting device and the connected mobile terminal by referring to the time of transmission of the echo request and the time of reception of the echo response. The propagation delay time is transmitted from the transmitter unit 70 to the host device 10. The control unit 120 in the host device 10 derives the propagation delay time between the host device 10 and the mobile terminal by adding the propagation delay time between the host device 10 and the client device 18 and the propagation delay time between the client device 18 and the mobile device. When the client device 18 does not transfer content data to the mobile terminal, the control unit 120 may only need to derive the propagation delay time between the host device 10 and the client device 18. Thus, the control unit 120 may allow for the presence of the mobile terminal and determine the propagation delay time between the host and the client device experiencing the worst circuit condition as the maximum propagation delay time.

In the information processing system 1 according to the embodiment, the host device 10 and the client device 18 acquire AV data for, for example, a film from the content distribution server 16 using progressive download. According to progressive download method, the download status of the information processing devices would not differ much if the communication environment in the network 14 does not vary a lot in the host device 10 and in the plurality of client devices 18. Meanwhile, in the case of the client server model, the content distribution server 16 is heavily loaded as the information processing devices download AV data from the content server 16, and the download status may differ depending on the information processing device since the communication environment in the network 14 may actually differ depending on the information processing device.

To illustrate one variation of the information processing system to address this, a description will be given of the process of playing back content data performed when AV data for, for example, a film is downloaded in the P2P model. In the P2P model, the information processing devices are not affected much by the communication environment and can acquire content data from a plurality of terminals connected to the network 14. Therefore, the P2P is superior in some respect to the client server model as a method of downloading.

FIG. 7 schematically shows the status of downloading content data. The content data downloaded is indicated by hatching. A file offset (hereinafter, also simply referred to as "offset") is used to identify the status of downloading content data. An offset indicates the position with reference to the head of a file for content data.

FIG. 7A shows the status of downloading content data using progressive downloading. In the illustrated example, the content data between offsets b1 and b2 is downloaded. In progressive downloading, the content data is downloaded from the start of the file. Therefore, offset b1 is invariably zero. Therefore, the last frame information derivation unit 132 of the host device 10 according to the embodiment may derive the last frame that can be played back in synchronization by referring to the download status in the information processing devices.

FIG. 7B shows the status of downloading content data in the P2P model. In the illustrated example, the content data between offsets b1 and b2, the data between offsets b3 and b4, and the data between offsets b5 and b_end have been downloaded. According to the P2P model, the content data are transmitted in pieces from a plurality of terminals via the network 14. Before starting to download data, the client device 18 acquires an index file that records index information on the content data from, for example, the content distribution server 16. The following description assumes that the content data is compressed in the MPEG2 format.

An index file includes a header area and an index data area. A header area contains information indicating the overall structure of the content data including the first PTS in the content data, the last PTS, the size of a motion picture file, etc. The index data area contains the PTS and file offset of each I frame, and the length information on the transport stream (TS) for each I frame.

In P2P download, the download status detection unit 60 of the client device 18 and the download status detection unit 100 of the host device 10 detect information related to frames in the downloaded data as the download status. The notification unit 66 in the client device 18 communicates the detected download status to the host device 10.

More specifically, the download status detection units 60 and 100 acquire offsets included in TS packets so as to detect offset information on the downloaded content data. The download status detection unit 60 and the download status detection unit 100 detect the downloaded offset information as the status of downloading the content data and identify the offset information on the content data not downloaded accordingly. In the example of FIG. 7B, the content data between offsets b0 and b1, the data between offsets b2 and b3, and the data between offsets b4 and b5 have not been downloaded. Therefore, the transmitter unit 70 in the client device 18 transmits a download request to the terminal that stores the content data. The download request continues to be transmitted until the content data acquisition unit 42 acquires the entirety of the data file, i.e., the data identified by the first PTS through the last PTS included in the index file. The above process is similarly performed in the host device 10.

As described above, the content data acquisition unit 42 in the client device 18 acquires the downloaded content data and stores the data in the storage unit 62. In this process, the download status detection unit 60 detects the downloaded offset information as the download status. The notification unit 66 communicates the detected download status to the host device 10 via the transmitter device 70 at a predetermined cycle. In the example of FIG. 7B, the offset information to be communicated should indicate that the content data between offsets b1 and b2, the data between offsets b3 and b4, and the data between b5 and b_end have been downloaded.

The content data acquisition unit 82 in the host device 10 also acquires the downloaded content data and stores the data in the storage unit 102. The download status detection unit 100 detects the downloaded offset information as the download status. It is preferable that the download status detection unit 100 detects the download status in synchronization with the download status detection unit 60.

The download status acquisition unit 86 in the host device 10 acquires the download status communicated from the client devices 18. If data are downloaded in the P2P model in the information processing system, the host device 10 is provided with a synchronized playback enabled frame information derivation unit in place of the last frame information derivation unit 132.

The synchronized playback enabled frame information derivation unit derives information on the frame that can be played back in synchronization in the information processing devices, by referring to the download status in the respective information processing devices. In MPEG2, playback can start at an I frame. The synchronized playback enabled frame information derivation unit derives the range of frames that can be played back continuously in the information processing devices, by referring to the offset information indicating the completion of download in the information processing devices.

In the example of FIG. 7B, the offset information indicates that the content data between offsets b1 and b2, the data between offsets b3 and b4, and the data between b5 and b_end have been downloaded. An example is shown below where information on frames that are included in the content data between offsets b1 and b2 and that can be played back is derived. As described already, the index data area of an index file contains the PTS, the file offset and the length information on the transport stream (TS) of all I frames included in the motion picture file. The description below assumes that the file offset of an I frame is denoted by a, and the length information is denoted by l.

FIG. 8A illustrates a motion picture file containing content data by way of an explanatory example. FIG. 8A shows a MPEG2 coded stream comprising transport stream (TS) packets. A motion picture file contains image information on I frames, P frames, and B frames. FIG. 8A shows TS packets for I frames related to the index file shown in FIG. 8B. The I frames are identified by an offset a and by a TS packet length l. A single TS packet basically has a fixed length (bytes). A TS packet length l is dependent on the number of packets forming an I frame. TS packets contain information for identifying offset a.

FIG. 8B illustrates an index file by way of an explanatory example. An index data area contains the PTS, offset, and length information for the associated I frame. The index file contains index information on the I frames included in the motion picture shown in FIG. 8A.

The synchronized playback enabled frame information derivation unit refers to the index information and derives the smallest offset a_min, of the offsets of those I frames with offsets greater than b1. If an I frame is identified by offset b1, a_min=b1. If an I frame is identified by an offset other than offset b1, the smallest offset a_min that satisfies a>b1 is derived.

The synchronized playback enabled frame information derivation unit refers to the index information, examines the offsets of those I frames where the value produced by adding the length l to the offset is b2 or smaller, and derives the largest offset a_max. In other words, the largest offset a_max that satisfies a+l≤b2 is derived.

As described above, a determination is made that the content data between offsets b1 and b2 can be played back continuously in a range between offsets a_min and a_max. The synchronized playback enabled frame information derivation unit similarly derives the offsets a_min and a_max, indicating a playable range, for the content data between offsets b3 and b4 and the data between b5 and b_end. The synchronized playback enabled frame information derivation unit derives the playable frame range by converting the playable offset range into frame information. In this way, the playable frame range is derived from the offset information shown in FIG. 7B. The frame information may be represented by PTS.

The synchronized playback enabled frame information derivation unit derives the range of frames playable in all of the client devices 18 by referring to the download status communicated from the client devices 18. The synchronized playback enabled frame information derivation unit derives the frames playable in the host device 10 by referring to the download status in the host.

The synchronized playback enabled frame information derivation unit derives the overlapping frame range by referring to the range of frames playable in the respective information processing devices. The overlapping frame range represents information on frames that can be played back in synchronization in the plurality of information processing devices. The notification unit 106 periodically communicates the derived frame information to the client devices 18 via the transmitter unit 110. The client device 18 updates the communicated frame information. Thus, in P2P download, synchronized playback is made possible by deriving information on frames that can be played back in synchronization in the plurality of information processing devices by referring to the download status in the information processing devices.

The control unit 120 generates an instruction for playback in accordance with the range of frames playable in synchronization. The range of frames playable in synchronization is equivalent in essence to the range between frame number 0 and last frame number described the embodiment. The control unit 120 is capable of producing a playback instruction or achieving a trick play within this range of frames, as described in the embodiment.

For example, responsive to a playback instruction containing playback start time and playback start frame information, the playback processing unit 64 or the playback processing unit 104 suspends the playback process upon completion of the playback of the last frame identified by the range of frames playable in synchronization. This suspends the playback process in all information processing devices.

Described above is an example of deriving information on frames that can be played back in synchronization when content data is downloaded in the P2P model. The P2P model may not have to be implemented by downloading content data from a plurality of terminals as described above. Content data may be downloaded from a plurality of content distribution servers 16, or content data may be downloaded from a plurality of content distribution servers 16 and a plurality of terminals. The P2P model referred to in this specification encompasses all methods of collecting partial content data from a plurality of devices, which can include a terminal or a server.

A description will be given of an application of the inventive technology. Content data downloaded may differ depending on the display resolution (HD, SD) of the output device 12 even if the data originate from the same movie. In such a case, a commercial message may be inserted in the high-resolution content data but not in the low-resolution content data. Thus, a situation may arise in which time synchronization is established but images as displayed is not synchronized. To address this, the host device 10 maintains the knowledge of the start frame number in the high-resolution and low-resolution movie data. Synchronization of images as displayed in the information processing devices can be achieved by correcting the frame number in accordance with the downloaded data.

For example, the synchronized playback enabled frame information derivation unit in the host device 10 may maintain a HD index file and an SD index fie. If the content data includes CM data, the head area of an index file contains a description of information related to the CM, and, more specifically, information indicating, for example, a duration in which the CM is inserted. The frame number of the frame at the start of movie data can be identified in the HD and SD movie files by referring to the index file. Therefore, by recognizing the head frame number of the HD and SD movie data, the synchronized playback enabled frame information derivation unit can derive information on frames that can be played back in synchronization in the information processing devices and can play back the movie data in synchronization between the plurality of information processing devices.

DESCRIPTION OF THE REFERENCE NUMERALS

1 . . . information processing system, 10 . . . host device, 12 . . . output device, 14 . . . network, 16 . . . content distribution server, 18 . . . client device, 20 . . . network server, 22 . . . video chat window, 24 . . . text chat window, 40 . . . receiver unit, 42 . . . content data acquisition unit, 44 . . . instruction acquisition unit, 46 . . . clock information acquisition unit, 48 . . . last frame information acquisition unit, 60 . . . download status detection unit, 62 . . . storage unit, 64 . . . playback processing unit, 66 . . . notification unit, 68 . . . request entry unit, 70 . . . transmitter unit, 80 . . . receiver unit, 82 . . . content data acquisition unit, 84 . . . clock information acquisition unit, 86 . . . download status acquisition unit, 88 . . . response acquisition unit, 90 . . . request acquisition unit, 100 . . . download status detection unit, 102 . . . storage unit, 104 . . . playback processing unit, 106 . . . notification unit, 108 . . . request entry unit, 110 . . . transmitter unit, 112 . . . download instruction unit, 120 . . . control unit, 122 . . . echo request generation unit, 124 . . . playback instruction generation unit, 126 . . . suspension instruction generation unit, 128 . . . fast forward instruction generation unit, 130 . . . rewind instruction unit, 132 . . . last frame information derivation unit The present invention provides a technology of allowing a plurality of information processing devices to play back content data in synchronization.

The invention claimed is:

1. An information processing system in which a content distribution server and a plurality of information processing devices are connected via a network,
   wherein a first of the information processing devices comprises:
   a first communication unit configured to download content data from the content distribution server over the network;
   a first storage unit configured to store the content data downloaded from the content distribution server;
   a first processing unit configured to play back the content data stored in the first storage unit;
   a first detection unit configured to detect a status of downloading the content data, where the status of downloading is an indication of a fraction of the content data that has been downloaded by the first information processing device from the content distribution server; and
   a first notification unit configured to communicate the detected status of downloading to a second of the information processing devices over the network via the first communication unit,
   wherein the second information processing device operates as a host device, which comprises:
   a second communication unit configured to download the content data from the content distribution server over the network;
   a second storage unit configured to store the content data downloaded from the content distribution server;
   a second processing unit configured to play back the content data stored in the second storage unit;
   a second detection unit configured to detect a status of downloading the content data, where the status of downloading is an indication of a fraction of the content data that has been downloaded by the second information processing device from the content distribution server;
   an acquisition unit configured to acquire the status of downloading communicated from the first information processing device; and
   a control unit configured to synchronize the play back of the content data in the first information processing device with the play back of the content data in the second information processing device based upon a comparison of the status of downloading of the first information processing device and the status of downloading of the second information processing device, which is the host device.

2. The information processing system according to claim 1, wherein the control unit identifies a last frame that can be played back in synchronization by referring to the status of downloading of the first information processing device and the status of downloading of the second information processing device, and the second information processing device, which is the host device, further comprises a second notification unit configured to communicate frame information identifying the last frame that can be played back in synchronization to the first information processing device.

3. The information processing system according to claim 2, wherein the first processing unit suspends the playback process when the last frame identified by the frame information communicated from the second notification unit is played back in the first information processing device.

4. The information processing system according to claim 2, wherein the first processing unit updates the frame information when the frame information communicated from the second notification unit is acquired.

5. The information processing system according to claim 1, wherein the first notification unit communicates the status of downloading of the first information processing device to the host device at a predetermined cycle.

6. An information processing system in which a content distribution server and a plurality of information processing devices are connected via a network, wherein a first of the information processing devices comprises:

a first communication unit configured to download content data from the content distribution server over the network;

a first storage unit configured to store the content data downloaded from the content distribution server;

a first processing unit configured to play back the content data stored in the first storage unit;

a first detection unit configured to detect a downloaded data volume of the content data as a download status, where the download status is an indication of a fraction of the content data that has been downloaded by the first information processing device from the content distribution server; and a first notification unit configured to communicate the detected download status to a second of the information processing devices over the network via the first communication unit, wherein the second information processing device operates as a host device, which comprises:

an acquisition unit configured to acquire the download status communicated from the first information processing device;

a control unit configured to identify a last frame that can be played back in synchronization by comparing the download status of the first information processing device and a download status of the host device, where the download status of the host device is an indication of a fraction of the content data that has been downloaded by the host device from the content distribution server; and a second notification unit configured to produce frame information identifying the last frame to the first information processing device.

7. The information processing system according to claim 6, wherein the first processing unit suspends the playback process when the last frame identified by the frame information communicated from the second notification unit is played back in order to synchronize the playback of the content data on the first information processing device with a playback of the content data on the host device.

8. The information processing system according to claim 6, wherein the first processing unit updates the frame information when the last frame information communicated from the second notification unit is acquired.

9. The information processing system according to claim 6, wherein the first notification unit communicates the download status to the host device at a predetermined cycle.

10. An information processing device comprising:

a communication unit configured to: (i) communicate with a content distribution server and a client device via a communication network, and (ii) download content data from the content distribution server over the communication network;

a storage unit configured to store the content data downloaded from the content distribution server;

a processing unit configured to play back the content data stored in the storage unit;

a detection unit configured to detect a status of downloading the content data, where the status of downloading is an indication of a fraction of the content data that has been downloaded by the information processing device from the content distribution server;

an acquisition unit configured to acquire a status of downloading of the client device that is communicated from the client device to the information processing device over the communication network, where the status of downloading of the client device is an indication of a fraction of the content data that has been downloaded by the client device from the content distribution server; and a control unit configured to synchronize the playback processes in the information processing device with a playback of the content data within the client device based upon a comparison of the status of downloading of the information processing device and the status of downloading of the client device.

* * * * *